Figure 1:
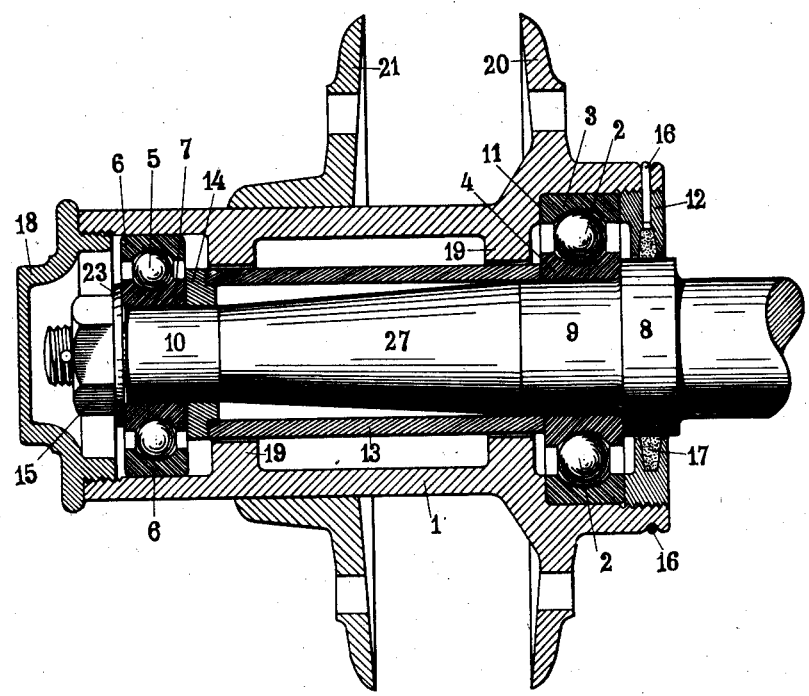

No. 882,846. PATENTED MAR. 24, 1908.
E. SACHS.
WHEEL HUB WITH BALL BEARINGS.
APPLICATION FILED DEC. 31, 1906.

2 SHEETS—SHEET 1.

Witnesses
E. R. Witman
A. E. Reese

Inventor
Ernst Sachs
By his attys.

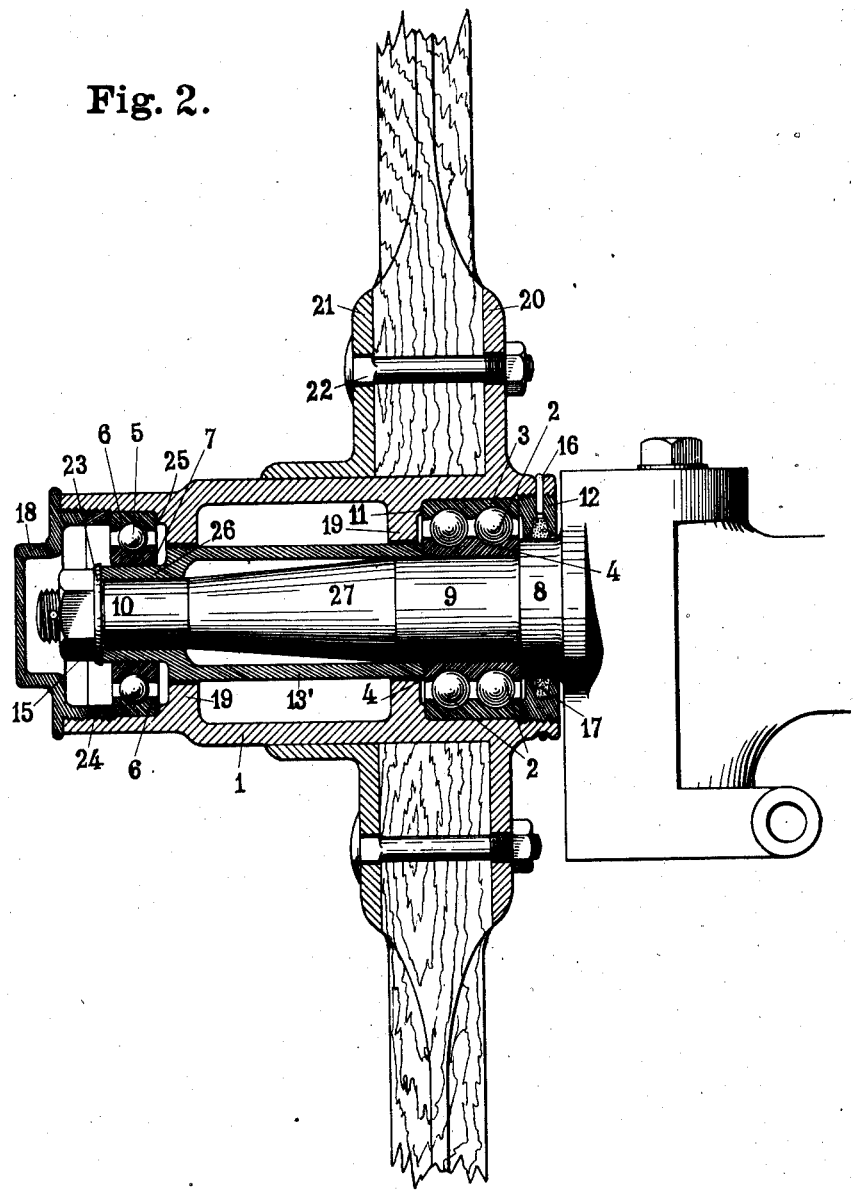

UNITED STATES PATENT OFFICE.

ERNST SACHS, OF SCHWEINFURT, GERMANY.

WHEEL-HUB WITH BALL-BEARINGS.

No. 882,846.   Specification of Letters Patent.   Patented March 24, 1908.

Application filed December 31, 1906. Serial No. 350,228.

*To all whom it may concern:*

Be it known that I, ERNST SACHS, a subject of the King of Bavaria, residing at No. 5 Schultes street, Schweinfurt, in Germany, have invented new and useful Improvements in Wheel-Hubs with Ball-Bearings, of which the following is a specification.

This invention relates to the ball-bearings in wheel-hubs for use with cars, coaches, automobiles, and other vehicles, and the object of this invention is to provide ball-bearings for such hubs which are so constructed and disposed as to obtain the best result in free and smooth running of the several separate rows of balls with a minimum of friction and without any jamming of the balls, which might be produced by a negligent assembling or mounting of the parts, or by the expansion or contraction of the parts with changes of temperature, or by wear and tear, or by any other cause; and further to prevent breakage of delicate parts by releasing the smaller ball-bearings from axial thrusts. To attain these objects, the ball-bearings (consisting of concentric ring sections with semi-circular circumferential grooves or race-ways in the confronting faces receiving the balls, and therefore adapted to receive or sustain axial or end-pressure in either direction), are disposed on the axle-end or journal and within the hub-body respectively in such a manner that the larger and more powerful ball-bearing located at the inner side of this arrangement is secured upon the axle-end and within the hub-boxing against axial displacement, while the smaller ball-bearing or bearings situated at the outer end of the hub are allowed an axial movement either on the journal or in the hub, so that a relative adjustment between the hub-barrel and the axle-journal can take place at that end, without affecting the work of the ball-bearings.

This arrangement is illustrated in the accompanying drawings forming a part of this specification, and in which—

Figure 1 is a longitudinal sectional elevation of a hub constructed in accordance with this invention, and Fig. 2 is a longitudinal sectional elevation of a modification of the same.

Similar numerals refer to similar parts throughout both illustrations.

Referring to Fig. 1, the hub-barrel or boxing 1 of cylindrical form is arranged on the tapering journal 27 of a continuous axle-tree or on a movable or swinging axle-end of an automobile, as the case may be, and rotating thereon by means of a number of ball-bearings inserted between these two parts. The ball-bearing 2 placed at the inner end of this construction is of larger dimensions than the ball-bearing 5 located at the outer end of the hub; each bearing comprising an outer hardened steel ring provided on its inner surface with an annular groove or race-way, a concentric inner steel ring with a similar groove in its periphery, and a number of balls inserted between the rings and running in the said grooves. The outer ring or race 3 of the larger ball-bearing 2 is clamped between a flange or shoulder 11 projecting inwardly in the hub 1 and a ring 12 screwed to or into the hub, thus being secured from axial displacement with respect to the hub itself, while the outer ring section 6 of the smaller ball-bearing 5 is fitted in the cylindrical interior of the hub relatively to which it is freely displaceable in axial direction. Between the inner race-ring 4 of the ball-bearing 2 passed upon and closely encircling the cylindrical part 9 of the tapering journal 27, and the inner race-ring 7 of the smaller ball-bearing 5 which is slipped upon the cylindrical part 10 of the journal, a tubular thrust-body or sleeve 13 is interposed, its outer end being guided by a centering ring 14 passed upon the journal 10 and disposed adjacent to the race-ring 7. The two parts 13 and 14 may however be made in one piece, if so preferred. The nut 15 which is screwed onto the screw threaded extremity of the axle-journal, by means of the interposed washer 23 bears against the outer face of the inner race-ring 7 of the smaller ball-bearing 5, and by the intermediary of the ring 14 and the sleeve 13 this pressure is also transmitted to the inner race-ring 4 of the larger ball-bearing 2 which is consequently pressed against the collar 8 on the jounal 27. By this means the inner race-rings of both the ball-bearings are fixed upon the journal through one and the same nut, while after unscrewing or removing the nut the whole hub may be readily withdrawn from the axle.

Locking of the ring 12 is obtained by means of a spring ring 16 engaging in a radial bore passing through the hub and this ring, the said spring ring being held in a groove in the periphery of the hub. The ring 12 also contains the usual dust excluding packing 17 of felt or the like, while the outer end of the hub is closed by a cap 18 screwed onto same. The inwardly projecting flanges 19 serve for strengthening the hub-body 1 and form supports which will bear and slide upon the circumference of the sleeve 13 in case of accidental breakage of any operative part of the ball-bearings.

The hub is provided on its outer periphery with a fixed and a loose flange, such as 20 and 21 respectively, between which the inner ends of the spokes of the wheel are clamped by means of bolts 22 in the ordinary manner (Fig. 2).

Referring to the modification of the arrangement illustrated in Fig. 2, which shows the hub in connection with an oscillating axle-journal, the general disposition of the parts is the same as above described, with the exceptions that the larger ball-bearing 2 contains two rows of balls, and that the arrangement in mounting the smaller ball-bearing differs in some respects from that in Fig. 1, without, however, changing the effect. In this construction the sleeve 13' is contracted or reduced at its outer end, so as to form a short tubular projection or boss 26 of less diameter, which is supported on the cylindrical stud 10 of the journal 27. The nut 15, by means of the interposed washer 23 bearing upon the reduced part 26, presses the inner end of the sleeve 13 against the inner race-ring 4 of the bearing 2, thereby fixing the said ring, which is supported by the collar 8 from the opposite side, on the cylindrical part 9 of the journal against axial displacement. Upon the periphery of the tubular projection 26 the inner race-ring 7 of the smaller ball-bearing 5 is axially slidable, while the outer race-ring 6 of this bearing is clamped in the hub-body 1 between an inwardly directed shoulder 25 and a ring 24 screwed into the hub, similarly to the fastening of the race-ring 3 above referred to. The outer race-ring of the larger ball-bearing 2 being secured in the hub against axial movement, and the inner race-ring of the same bearing being held between the collar 8 and the nut 15, any axial thrust or end-pressure is received by this bearing, while the smaller ball-bearing is not subjected to axial shocks because it is axially displaceable and therefore allows of a relative movement of the hub-bushing and the journal. By this self-adjustment of the smaller bearing the balls in both the bearings are permitted to run at all times on the bottom of the grooves, that is to say, under the most favorable conditions, without requiring careful assembling of the parts, and even with an unequal dilatation of the hub and the journal with variations of temperature. By this arrangement it is further rendered possible to conform the hub to the tapering axle-end with the employment of a smaller ball-bearing at the outer end, the danger of rupture of this delicate part being obviated by releasing the same from axial thrust. The completely assembled hub can be pushed upon or removed from the axle-journal as a whole.

In the drawings two constructional modifications are represented for purpose of examples, but evidently the arrangement may be varied without altering the principle of the invention. For instance, the smaller ball-bearing may be displaceable in the hub, as shown in Fig. 1, and also on the journal, as illustrated by Fig. 2, if desired. I therefore do not wish to be limited to the said constructions, but

What I claim as my invention, and desire to secure by Letters Patent, is—

1. In a wheel bearing, the combination with a hub-barrel, of an axle-journal, a plurality of ball-bearings comprising concentric race-rings and balls received in grooves formed in the confronting portions of the said rings, the larger ball-bearing being fixed with its outer ring in the inner end of the hub-barrel between a shoulder and a ring screwed into the hub, and with its inner ring on the journal, the smaller ball-bearing being arranged displaceable, so as to be released from end-thrust, a fixed collar on the inner end of the journal, a nut screwed to the free extremity of the journal and a sleeve interposed between the nut and the inner race-ring of the larger ball-bearing, so as to secure the said race-ring against axial movement between the collar on one side and the sleeve and nut on the other side.

2. In a wheel-bearing, the combination of an axle-journal and hub-barrel thereon, an interposed ball-bearing in fixed axial relation to both the hub and axle adapted to sustain end thrust as well as radial pressure, and an interposed ball-bearing not in fixed axial relation to both the hub and axle but displaceable relative to one of said parts so as to take only radial pressure and a thrust-member interposed between the two ball-bearings.

3. In a wheel-bearing, the combination of an axle-journal and hub-barrel thereon, a collar provided on the inner end of said axle-journal, an annular ball-bearing comprising concentric grooved rings and interposed balls, arranged in the inner end of the hub and in fixed relation to both the hub-barrel and axle-journal, the inner ring of said bearing abutting said collar, and a similar ball-bearing in the outer end of the hub, only one ring of the latter being in fixed relation, a nut screwed on the outer end of said axle-journal, and a thrust-member interposed between said nut and the inner ring of the first-mentioned ball-bearing.

In testimony whereof I have signed my name to this specification in the presence of two subscribing witnesses.

ERNST SACHS.

Witnesses:
    HEINRICH KASTRUP,
    HANS ROTTENBERGER.